US008249027B2

(12) United States Patent
Lu

(10) Patent No.: US 8,249,027 B2
(45) Date of Patent: Aug. 21, 2012

(54) MULTICARRIER COMMUNICATION SYSTEM, AND METHOD AND DEVICE FOR CONFIGURING CARRIER CHANNEL

(75) Inventor: Jianmin Lu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 842 days.

(21) Appl. No.: 12/105,981

(22) Filed: Apr. 18, 2008

(65) Prior Publication Data

US 2008/0198813 A1    Aug. 21, 2008

Related U.S. Application Data

(63) Continuation of application No. PCT/CN2006/002805, filed on Oct. 20, 2006.

(30) Foreign Application Priority Data

Oct. 20, 2005    (CN) .......................... 2005 1 0118225

(51) Int. Cl.
*H04W 4/00*    (2009.01)
(52) U.S. Cl. ........................................................ 370/334
(58) Field of Classification Search ................ None
See application file for complete search history.

(56) References Cited

U.S. PATENT DOCUMENTS

| | | | |
|---|---|---|---|
| 5,805,576 A | 9/1998 | Worley, III et al. | |
| 7,149,190 B1 * | 12/2006 | Li et al. | 370/278 |
| 2002/0036997 A1 | 3/2002 | Kim et al. | |
| 2002/0196752 A1 * | 12/2002 | Attar et al. | 370/331 |
| 2004/0266466 A1 | 12/2004 | Kim et al. | |
| 2005/0057554 A1 | 3/2005 | Yamamoto et al. | |

FOREIGN PATENT DOCUMENTS

| | | |
|---|---|---|
| CN | 1203725 A | 12/1998 |
| CN | 1251706 A | 4/2000 |
| CN | 1260916 A | 7/2000 |
| CN | 1306701 A | 8/2001 |
| CN | 1306702 A | 8/2001 |
| CN | 1549485 A | 11/2004 |
| CN | 1551552 A | 12/2004 |
| CN | 1567785 A | 1/2005 |
| CN | 1596054 A | 3/2005 |

(Continued)

OTHER PUBLICATIONS

International Search Report for International Application No. PCT/CN2006/002805, dated Feb. 8, 2007, with English translation.

(Continued)

*Primary Examiner* — Raj Jain
(74) *Attorney, Agent, or Firm* — Huawei Technologies Co., Ltd.

(57) ABSTRACT

The present disclosure relates to mobile communication technologies and provides a multicarrier communication system, and a method and device for configuring a carrier channel, by which the reverse carrier and the corresponding forward carrier may be allocated flexibly, various multicarriers may be configured, the service requirements may be met better, and the terminal transmit power and the communication resources may be saved. In the present disclosure, the MAC channels corresponding to zero or a plurality of reverse carriers may be flexibly configured to the forward carrier, and the MAC channel may or may not include a DRC_Lock subchannel; additionally, in various embodiments, the MAC channels corresponding to a plurality of reverse carriers may be configured to the same forward carrier, so that the channel resources may be fully utilized.

20 Claims, 2 Drawing Sheets

FOREIGN PATENT DOCUMENTS

| KR | 20010066277 A | 7/2001 |
|---|---|---|
| KR | 100425080 B | 3/2004 |
| KR | 20040054827 A | 6/2004 |

OTHER PUBLICATIONS

3rd Generation Partnership Project 2 "3GPP2"; "CDMA 2000 High Rate Packet Data Air Interface Specification"; 3GPP2 C.S0024-A; Version 2.0; Jul. 2005; 1227 pages.

Yi, Wan; The Next Generation Technologies of cdma 2000; Telecommunications Science; 1994-2011 China Academic Journal Electronic Publishing House; 4 pages.

Zhu, Xiaoguang, et al.; "CDMA2000 Standard and Technologies Development Status"; Mobile Communications; 1994-2011 China Academic Journal Electronic Publishing House; 5 pages.

English translation of the Written Opinion of the International Searching Authority for International Patent Application No. PCT/CN2006/002805, dated Feb. 8, 2007.

\* cited by examiner

MULTICARRIER COMMUNICATION SYSTEM, AND METHOD AND DEVICE FOR CONFIGURING CARRIER CHANNEL

CROSS-REFERENCE TO RELATED APPLICATIONS

This application is a continuation of International Application No. PCT/CN2006/002805, filed Oct. 20, 2006. This application claims the benefit of Chinese Application No. 200510118225.8, filed Oct. 20, 2005. The disclosures of the above applications are incorporated herein by reference.

FIELD

The present disclosure relates to the technical filed of mobile communications, and in particular, to a multicarrier mobile communication system, and a method and device for configuring a carrier channel.

BACKGROUND

The statements in this section merely provide background information related to the present disclosure and may not constitute prior art.

With the popularization of mobile communications, mobile voice communications alone cannot meet people's requirements on information acquisition. Mobile data communication service shows its strong vitality and prosperous development prospect. One of 3rd Generation (3G) mobile communication technologies, Code Division Multiple Access 2000 1x (CDMA 2000 1x) Evolution Data Optimized (EV-DO), emerges as the times require.

The peak rate supported by the carrier frequency in each sector in 3rd Generation Partnership Project 2 (3GPP2) CDMA2000 1XEV-DO reaches 2.4 Mbps, and the peak rate of its DO revision A (DO rev A) reaches 3.1 Mbps. At present, a preliminary agreement has been made on the evolution of the air interface technology of 3GPP2 in the industry. Specifically, the evolution is divided into 2 phases: in Phase 1, multicarrier DO technology is employed, a higher peak rate is obtained by upper layer software updating, while the physical layer remains unchanged to the maximum extent, and backward compatibility may be ensured; in Phase 2, more advanced novel technology is introduced, which is a long-term evolution plan of 3GPP2.

The DO system is divided into Pilot channel, Media Access Control (MAC) channel, Control channel and Traffic channel in the forward direction. Time Division Multiplex (TDM) is employed in these channels, and fixed power transmission is adopted.

The MAC channel is further divided into Reverse Activity (RA) subchannel, Data Rate Control Lock (DRC_Lock) subchannel, Reverse Power Control (RPC) subchannel and Automatic Repeat Request (ARQ) subchannel. Code division multiplex (CDM) is employed in these subchannels. The sum of the power of the subchannels is a fixed value, which is referred to as rated power. The RA subchannel is a common channel, i.e., all the terminals share an RA channel. Other subchannels are non-common channels, and each terminal corresponds to its own channel.

For CDMA, RPC still plays an important role in the DO system. A terminal receives an RPC instruction issued by a base station and adjusts the transmit power according to the instruction, so as to guarantee the transfer quality of the reverse channel.

In addition, the base station in the DO system periodically sends a Reverse Activity Bit (RAB) indicating the busy and idle state of the system according to the current load. The terminal determines the reverse transmit speed by itself via an algorithm according to the received RAB.

In a DO rev A system, there is a Hybrid Automatic Retransmission Request (HARQ) mechanism in the reverse direction. When data is retransmitted, the data packet transmitted in the reverse direction may be divided into several subframes. After each subframe is transmitted, the terminal checks the forward ARQ subchannel. If the ARQ indicates that the base station has received the subframe successfully, the terminal terminates the transmission of the packet in advance, and the remaining subframes are not transmitted.

Thus, it can be seen that the transfer quality of the RPC/RAB/ARQ in the forward direction has an important effect on the reverse channel. If the RPC is received incorrectly, interference may be caused due to too strong power and the reverse capability may be lowered, or the reverse quality may be affected due to insufficient power. If the RAB is received incorrectly, the reverse speed of the terminal may be too high, the transfer quality may be lowered and overload may be caused, or the reverse speed of the terminal may be too low, the transfer time delay may be increased and the system capability may be wasted. Moreover, once an error occurs on the ARQ subchannel, a successfully received subframe may be transmitted repeatedly and the system capability may be wasted, or a subframe that has not been transmitted successfully may be terminated incorrectly and an error may occur.

The CDMA technology is still employed in reverse link of the DO system. The reverse channels are divided into reverse access channel and reverse transfer channel. The reverse transfer channel further includes pilot channel, Reverse Rate Indication (RRI) channel, Data Source Control (DSC) channel, Data Rate Control (DRC) channel, Acknowledge (ACK) channel and Data channel, etc.

In the multicarrier communication system, there exists a problem of forward and reverse carrier channel configuration, including how to configure the channel and subchannel on each forward carrier as well as the reverse carrier channel corresponding to each subchannel on each forward carrier, etc. For example, to support a reverse carrier in which DRC is transmitted, the RPC subchannel, ARQ subchannel and DRC_Lock subchannel should exist in the forward MAC channel. The RPC subchannel controls the power of the reverse channel, the ARQ subchannel acknowledge the reverse channel, and the DRC_Lock subchannel indicates the reception quality of the reverse DRC. However, to support a reverse carrier in which no DRC is transmitted, only the RPC subchannel and the ARQ subchannel need to exist in the forward MAC channel, where the RPC subchannel controls the power of the reverse channel and the ARQ subchannel confirms the reverse channel, while the DRC_Lock subchannel is not needed any more. The problem of carrier channel configuration is especially apparent when the forward and the reverse channels are not symmetrical.

During the process in which a new reverse carrier is added, when the demand of reverse traffic exceeds that of forward traffic, i.e., when the number of the reverse carriers needed exceeds the number of the forward carriers needed, some redundant forward carriers may appear in the method that follows the monocarrier DO system in the prior art, in which the number of the forward carriers and the reverse carriers is kept consistent. These redundant forward carriers only send the MAC channels of the corresponding reverse carriers, including the RPC subchannel, the ARQ subchannel and the DRC_Lock subchannel, while no forward data is carried.

Although the corresponding reverse carriers do not need to receive the forward channel data, the DRC still needs to be transmitted, so that the network may control the power of the forward MAC channel and perform other corresponding operations. Thus, although the terminal does not receive any data on the redundant forward carrier, the terminal still needs to transmit the DRC.

Apparently, in this processing method, the number of the forward carriers is not less than the number of the reverse carriers, and all the reverse carriers transmit the DRC. Therefore, the flexibility of the system is lowered, the load of the terminal is increased, and the battery life of the terminal is shortened. Specifically, because the number of the forward carriers cannot be less than the number of the reverse carriers, the allocation efficiency and flexibility of the system are lowered. Although the terminal does not receive any data on the redundant forward carrier, the terminal still needs to transmit the DRC; in other words, all the reverse carriers need to transmit the DRC, so that the load of the terminal is increased, and the battery life of the terminal is reduced.

When the number of the reverse carriers needed exceeds the number of the forward carriers needed, in another prior art, it is allowed that the number of the forward carriers may be less than the number of the reverse carriers. Thus, some reverse carriers have no corresponding DRC to report, and because the reverse carrier is allowed not to transmit DRC channel, the transmit power may be saved on the terminal. At this point, the forward DRC_Lock subchannel is not needed either.

In still another prior art, in addition to the forward MAC channel (including RPC, ARQ and DRC_Lock subchannels) corresponding to a reverse carrier in which DRC is transmitted, the forward carrier may further carry forward MAC channels (including RPC and ARQ subchannels) corresponding to other reverse carriers in which no DRC is transmitted. The system may allocate a plurality of MAC channel indexes to a forward carrier via a Traffic Channel Assignment (TCA) message, wherein a MAC channel index is allocated to the forward MAC channel (including RPC, ARQ and DRC_Lock subchannels) corresponding to the reverse carrier in which DRC is transmitted; and other MAC channel indexes are allocated to the forward MAC channel (including RPC and ARQ subchannels) corresponding to the reverse carrier in which no DRC is transmitted.

In the prior art, a plurality of forward MAC channels (one MAC channel includes an RPC subchannel, an ARQ subchannel and a DRC_Lock subchannel, and other MAC channels include an RPC subchannel and an ARQ subchannel) may be carried on a forward carrier, and a plurality of reverse carriers may be supported. Therefore, the number of the forward carriers allocated by the system may be less than that of the reverse carriers, so that flexibility may be improved. Meanwhile, some reverse carriers do not need to transmit DRC channel, so that power may be saved.

However, in practical applications, following problems exist in the prior art. Specifically, each forward carrier can support only one MAC channel corresponding to the reverse carrier that transmits the DRC and a plurality of MAC channels corresponding to the reverse carriers that do not transmit DRC. Therefore, this prior art is only suitable for the case in which the number of the forward carriers is less than that of the reverse carriers, but does not support the flexible allocation of the reverse carriers and the forward carriers that carry the corresponding forward MAC channels (including RPC, ARQ and DRC_Lock subchannels), so its application scenarios are limited, and the flexibility of the system is not as high as required. Especially in some special applications, for example, for the services where the difference between the reverse transmission quantity and forward transmission quantity is great and the services that change rapidly, the requirements of the services cannot be well met, and the terminal transmit power and other resources cannot be saved to the maximum extent.

SUMMARY

The present disclosure provides a method for configuring a carrier channel in a multicarrier communication system. With the method, the reverse carrier and the corresponding forward carrier may be allocated flexibly, various multicarriers may be configured, and the service requirements may be met better.

According to various embodiments of the present disclosure, a method for configuring a carrier channel in a multicarrier communication system, includes: configuring, by the system, any one forward carrier according to information of a corresponding reverse carrier, so as to make the forward carrier carry Media Access Control channels corresponding to N reverse carriers, wherein N is a non-negative integer.

The Media Access Control channel corresponding to the reverse carrier comprises a Data Rate Control Lock subchannel, when any one or more reverse carriers corresponding to the forward carrier transmit a Data Rate Control channel.

According to various embodiments of the present disclosure, a multicarrier communication system, includes:

a network side device adapted to configure one corresponding forward carrier according to information of N reverse carriers to make the forward carrier carry Media Access Control channels corresponding to the N reverse carriers, N being a non-negative integer; and adapted to inform a terminal of configuration information; and a terminal adapted to process the forward carrier according to the configuration information received.

According to various embodiments of the present disclosure, a network side device in a multicarrier communication system, includes:

a reverse carrier information determining unit adapted to determine information of N reverse carriers corresponding to one forward carrier to be configured;

a forward carrier configuring unit adapted to configure the forward carrier according to the information of the reverse carriers to make the forward carrier carry the Media Access Control channels corresponding to the N reverse carriers, N being a non-negative integer; and an informing unit adapted to inform the terminal of the configuration information.

In the present disclosure, because the forward carrier may be configured with the MAC channels of one or more reverse carriers, or even no MAC channel of the reverse carrier may be configured, no limitation is laid on the number of the forward and reverse carriers, and it is allowed that the number of the forward carriers is greater than, equal to or less than the number of the reverse carriers, so that the flexibility of the system may be improved.

Moreover, any forward carrier may be configured to include or not to include the DRC_Lock subchannel, so no limitation is laid on whether the corresponding reverse carrier transmits the DRC. As a result, the forward MAC channels of a plurality of reverse carriers may be configured flexibly, and the convenience degree of the system configuration may be improved.

Additionally, in the range allowed by the bearing capacity of the forward carrier, MAC channels of a plurality of reverse carriers are configured to a forward carrier, so that channel resources may be full utilized, and the utilization efficiency may be improved. Moreover, the case in which some reverse carriers do not need to send DRC channel is also supported. Therefore, transmit power may be saved greatly, the electric power consumption of the system terminal may be lowered, and the competitive power of the product may be enhanced.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

To make the objects, technical solutions and advantages of the present disclosure more clear, the present disclosure is now described in detail in conjunction with the drawings.

In the present disclosure, the degree of the configuration flexibility of carrier channels in a system may be increased. When a MAC channel corresponding to a reverse carrier is configured for a forward carrier, no limitation is laid on the number of the reverse carriers and the type of the MAC channel. Any number of MAC channels corresponding to a reverse carrier may be configured for a forward carrier, and even the case in which no reverse carrier is configured, i.e., the number of the reverse carrier is zero, may be included. Moreover, the MAC channel configured may include a combination of many varieties of subchannels. For example, the DRC_Lock subchannel may or may not be included; correspondingly, the corresponding reverse carrier may or may not transmit the DRC channel.

On this basis, the system may be able to configure any number of carriers as well as channels and subchannels of any constitution. The system may configure MAC channels corresponding to a plurality of reverse carriers to a forward carrier, so that power may be saved. Alternatively, some forward carriers may not be configured with any MAC channel.

Configuration information may be sent to a terminal in an extended TCA message, so that a flexible configuration may be realized.

Figure 1:
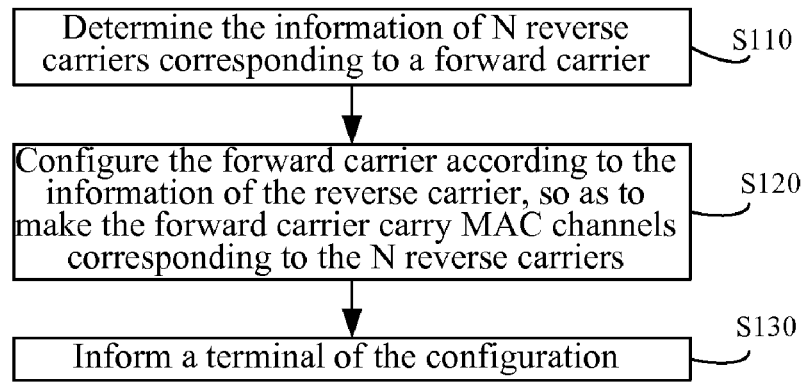
FIG. 1 is a flow chart of the method for configuring a carrier channel according to an embodiment of the present disclosure.

Please refer to FIG. 1, which is a flow chart of the method for configuring a carrier channel in a multicarrier communication system according to an embodiment of the present disclosure.

S110: The information of N reverse carriers corresponding to a forward carrier is determined, where N is a non-negative integer.

S120: The forward carrier is configured according to the information of the reverse carrier, so as to make the forward carrier carry MAC channels corresponding to the N reverse carriers.

S130: A terminal is informed of the configuration, so that the terminal is able to process the forward carrier correctly.

In an embodiment of the present disclosure, the system may configure the forward carrier as needed, so that the forward carrier may carry MAC channels corresponding to a plurality of reverse carriers, and no restriction is laid on whether the reverse carrier transmits the DRC channel. In other words, for any reverse carrier, if it transmits the DRC channel, the corresponding MAC channel will include a DRC_Lock subchannel; otherwise, no DRC_Lock subchannel is included. In other words, the MAC channel carried by any forward carrier may or may not include a DRC_Lock subchannel; and the number of the MAC channels that include the DRC_Lock subchannel is not limited.

In the technical solution of the present disclosure, any forward carrier may include any number of the MAC channels and any combination thereof.

For example, a forward carrier may carry n MAC channels that include the DRC_Lock subchannel and m MAC channels that do not include the DRC_Lock subchannel, where m and n may be any positive integer. Therefore, corresponding to the case in which n reverse carriers transmit the DRC channel, the n MAC channels include the DRC_Lock subchannel, RPC subchannel and ARQ subchannel; and corresponding to the case in which m reverse carriers do not transmit the DRC channel, the m MAC channels only include the RPC subchannel and ARQ subchannel.

Moreover, considering the case in which the number of the reverse carriers may be less than that of the forward carriers, the system may further configure some forward carriers as needed, so as to make these forward carriers not carry the MAC channel corresponding to any reverse carrier; in other words, the number of the MAC channel carried is 0. Thus, the entire carrier configuration may be supported, and it is allowed that the number of the forward carriers is greater than, equal to or less than that of the reverse carriers. Because one forward carrier may carry one, a plurality of or zero forward MAC channels, these MAC channels may or may not include the DRC_Lock subchannel, so that the forward MAC channels of a plurality of reverse carriers may be configured flexibly. Flexibility in real sense may be realized, and application scenarios may be extended. Meanwhile, it is also supported that some reverse carriers do not send the DRC channel, so that power may be saved.

It should be noted that the system allocates different MAC channel indexes to the MAC channels corresponding to different reverse carriers that are carried by the forward carrier, so that it is convenient to distinguish between the MAC channels. The forward carrier carries the subchannel of the MAC channel via Time Division Multiplexing (TDM). Therefore, in the technical solution of the present disclosure, no extra overhead is introduced, because the forward MAC channel corresponding to a user is time-division multiplexed. The RPC, ARQ and DRC_Lock subchannels may be supported at the same time so long as a MAC channel index is allocated. Thus, in comparison with the case in which only the RPC and ARQ subchannels are supported, no extra overhead is introduced in the case in which the RPC, ARQ and DRC_Lock subchannels are supported at the same time.

In addition, the system may also select to reconfigure the forward carrier when the communication status is changed. In other words, the system may reconfigure the forward carrier according to the information of the existing load and the channel quality of the forward carrier and the reverse carrier, and change the number of the MAC channels corresponding to the reverse carrier that are carried by the forward carrier. For example, according to the information of the existing load or channel quality of the carrier, the forward MAC channels corresponding to a plurality of reverse carriers may be relocated to a forward carrier, so that the load of each forward carrier is averaged, or the number of the forward carriers may be reduced. Thus, channel resources may be full utilized, and the utilization efficiency may be improved.

In an embodiment of the present disclosure, the MAC channel corresponding to zero or a plurality of reverse carriers is carried on one forward carrier, and the MAC channel may include different subchannels. In comparison with the prior art, first of all, the number of the MAC channel that is carried may be zero; secondly, depending on whether the reverse carrier sends the DRC, the MAC channels carried may or may not include the DRC_Lock subchannel. As a result, the flexibility of the system may be improved.

In an embodiment of the present disclosure, when configuring the forward carrier, the system may allocate zero or a plurality of MAC channel indexes to one forward carrier via a TCA message. Each MAC channel index is allocated to the forward MAC channel corresponding to the respective reverse carrier, and the MAC channel may be constituted of different subchannels.

Specifically, in the TCA message, a parameter may be configured, which is used to indicate whether there exists a MAC channels thereon or indicate the number of the MAC channel. When the parameter is not definitely included in the TCA message, the number of the MAC channel carried by the forward carrier is 1 by default. Another parameter may be employed to indicate whether the above parameter is included in the TCA message. Meanwhile, still another parameter may be used to indicate whether the MAC channel includes the DRC_Lock subchannel. Moreover, a parameter may also be employed to indicate the reverse carrier corresponding to the forward carrier. The action time for the forward and the reverse carrier may be specified in advance, which is similar to the action time sequence of other parameters in the TCA.

Please refer to Table 1, which shows an example of the information included in the TCA message.

TABLE 1

| Field | Length/bit |
|---|---|
| MessageID | 8 |
| MessageSequence | 8 |
| DSCChannelGain | 5 |
| FrameOffset | 4 |
| NumSectors | 3 |
| NumChannels | 4 |
| AssignedChannelIncluded | 1 |
| NumSectors occurrences of the following SectorInformation record: | |
| { | |
| RAChannelGain | |
| PilotPN | |
| DRCCover | |
| AuxDRCCoverIncluded | |
| AuxDRCCover | |
| SofterHandoff | |
| } | |
| NumChannels occurrences of the following ActiveSetParameters record | |
| { | |
| AssignedChannel | |
| FeedbackReverseChannelIndex | |
| LongCodeMaskIndex | |
| DRCLength | |
| DRCChannelGain | |
| ForwardTrafficValid | |
| ACKChannelGain | |
| NumReverseChannelsIncluded | |
| NumReverseChannels | |

TABLE 1-continued

| Field | Length/bit |
|---|---|
| ReverseChannelConfiguration | |
| ReverseChannel | |
| ReverseChannelNumber | |
| NumSectors occurrences of the following record: | |
| { | |
| TrafficMACIndexPerInterlaceEnabled | |
| NumUniqueTrafficMACIndexes | |
| If TrafficMacIndexPerInterlaceEnabled is set to 1, NumUniqueTrafficMACIndexes+1 occurrences of the following record; otherwise, 1 occurrence of the following record: | |
| { | |
| TrafficMACIndex | |
| AssignedInterlaces | |
| } | |
| FeedbackForwardChannelIndexIncluded | 0 or 1 |
| FeedbackForwardChannelIndex | 0 or 4 |
| MACIndex | 0 or 8 |
| } | |
| } | |
| N occurrences of the following field, where N is the number of SofterHandoff fields set to '0' in this message | |
| DSC | 3 |
| Reserved | Variable |

As shown in the above table, the TCA includes the following parameters:

NumChannels, which indicates the number of the channels that transfer data forwardly or backwardly;

FeedbackReverseChannelIndex, which may be set to be binary "1111" when no feedback reverse channel exists.

ForwardTrafficValid, which indicates whether a MAC channel index (TrafficMACIndex) is allocated to the current carrier;

ReverseChannelConfiguration, which describes the correlation between the CDMA reverse channel and the current forward channel in the cases that the forward transmission is valid or invalid respectively.

FeedbackForwardChannelIndex, which indicates the corresponding forward channel for transferring the MAC subchannels RPC/ARQ/DRC_Lock of the current reverse channel;

MACindex, which indicates the power control channel for the terminal corresponding to the current reverse channel that exists in the current sector; when the FeedbackForwardChannelIndex is valid, this field is allocated to the forward channel indicated by the FeedbackForwardChannel Index;

NumReverseChannels, which indicates the number of the reverse channel corresponding to the forward carrier;

NumReverseChannelsIncluded, which indicates whether the message includes the field NumReverseChannels;

ReverseChannelNumber, which indicates the channel index of the reverse channel corresponding to the forward carrier.

Figure 2:
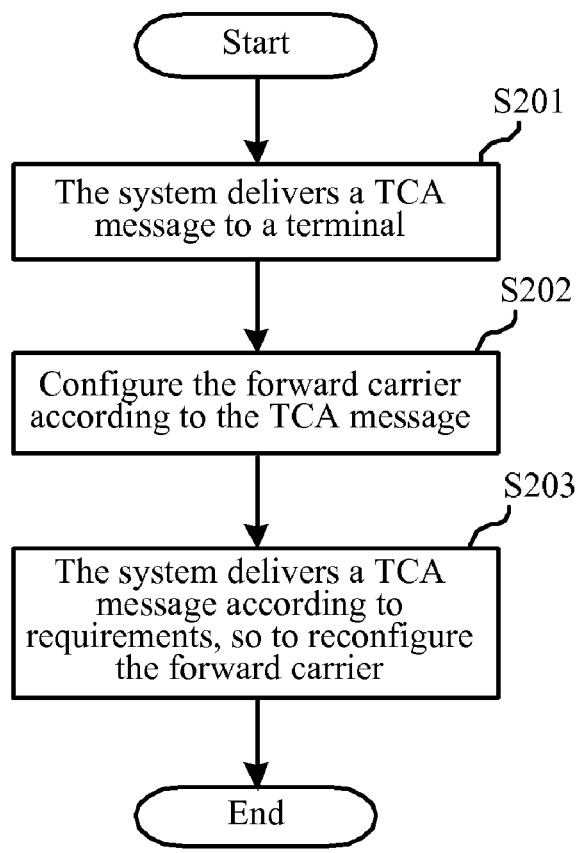
FIG. 2 is a flow chart of the process in which a terminal is informed of the configuration according to an embodiment of the present disclosure.

FIG. 2 is a flow chart showing the case in which a terminal is informed of the configuration of the forward carrier according to an embodiment of the present disclosure.

In Block S201, the system first generates a TCA message according to the configuration of the forward carrier. Various parameters are filled in the TCA message, and these parameters correspond to the configuration.

In Block S202, the terminal obtains the configuration of the carrier according to the TCA message.

In Block S203, because the operation status and so on of the system are changed, the forward carrier may need to be reconfigured, the number of the reverse carrier corresponding to the forward carrier needs to be changed, and some reverse carriers need to be shifted or combined to the forward carrier.

Those skilled in the art may appreciate that in the above embodiments, although illustration has been made with the forward MAC channel of the CDMA2000 1x EV-DO system as an example, for other channels in other 3G mobile communication systems, the corresponding allocation schemes may be implemented in the case where the channel power is allocated according to a rated power limitation, so that the object of the present disclosure may be realized, and the spirit and scope of the present disclosure will not be influenced.

Figure 3:
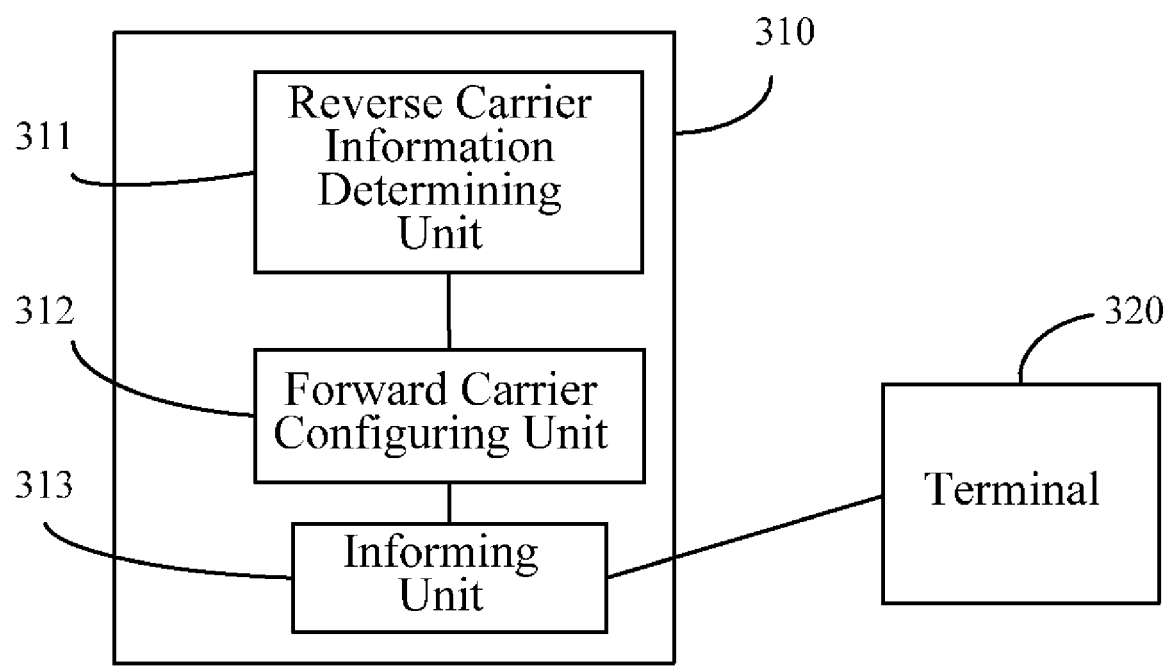
FIG. 3 is a block diagram of a multicarrier communication system according to an embodiment of the present disclosure.

Please refer to FIG. 3, which is a block diagram of the multicarrier communication system according to an embodiment of the present disclosure.

The multicarrier communication system includes a network side device 310 and a terminal 320. The network side device 310 is adapted to configure one corresponding forward carrier according to the information of N reverse carriers, so as to make the forward carrier carry the MAC channels corresponding to the N reverse carriers, where N is a non-negative integer; and is adapted to inform the terminal 320 of the configuration. The terminal 320 is adapted to process the forward carrier according to the received configuration.

The network side device 310 includes: a reverse carrier information determining unit 311 adapted to determine the information of N reverse carriers corresponding to one forward carrier to be configured; a forward carrier configuring unit 312 adapted to configure the forward carrier according to the information of the reverse carrier to make the forward carrier carry the MAC channels corresponding to the N reverse carriers, N being a non-negative integer; and an informing unit 313 adapted to inform the terminal 320 of the configuration.

In an embodiment, the informing unit 313 is a TCA message processing unit adapted to put the configuration information into a TCA message and send the massage to the terminal.

In a specific realization, the TCA message processing unit may include: a first parameter configuring unit is adapted to configure a first parameter to indicate the number of the MAC channel carried by the forward carrier; a second parameter configuring unit adapted to configure a second parameter to indicate whether the TCA message includes the first parameter; a third parameter configuring unit adapted to configure a third parameter indicate the reverse carrier corresponding to the forward carrier; and a fourth parameter configuring unit adapted to configure a fourth parameter to indicate whether the MAC channel carried by the forward carrier includes the DRC_Lock subchannel. The TCA message processing unit may further include a time sequence configuring unit adapted to configure the action time sequence of the correlation between the forward carrier and the reverse carrier.

Those skilled in the art may appreciate that in the present disclosure, the network side device may have various forms according to the practical situations and the requirements. For example, in a CDMA2000 1x EV-DO system, the network side device may be a base station or other devices in the access network.

Additional advantages and modifications will readily occur to those skilled in the art. Therefore, the present disclosure in its broader aspects is not limited to the specific details and representative embodiments shown and described herein. Accordingly, various modifications and variations may be made without departing from the spirit or scope of the present disclosure as defined by the appended claims and their equivalents.

What is claimed is:

1. A method for configuring carrier channels in a multicarrier communication system, comprising:
    obtaining, by a network side device of the multicarrier communication system, information of a plurality of reverse carriers; and
    configuring, by the network side device, one forward carrier corresponding to the plurality of reverse carriers according to the information of the reverse carriers, so as to make the one forward carrier to carry a plurality of Media Access Control channels corresponding to the plurality of reverse carriers;
    wherein configuring the one forward carrier comprises:
    allocating different Media Access Control channel indexes to the Media Access Control channels corresponding to different reverse carriers; and
    if one of the plurality of reverse carriers corresponding to the one forward carrier has a Data Rate Control channel to transmit, configuring the Media Access Control channel that corresponds to the one of the plurality of reverse carriers so that the Media Access Control channel comprises a Data Rate Control Lock subchannel.

2. The method according to claim 1, wherein if one of the plurality of the reverse carriers has a Data Rate Control channel to transmit, the configuring the one forward carrier further comprises:
    sending a Data Rate Control Lock indication in the forward carrier corresponding to the allocated Media Access Control channel index for the reverse carrier that carries the Data Rate Control channel.

3. The method according to claim 1, wherein:
    each of at least two of the plurality of reverse carriers corresponding to the forward carrier has a Data Rate Control channel to transmit, each of the Media Access Control channels corresponding to the each of the at least two reverse carriers comprises a Data Rate Control Lock subchannel.

4. The method according to claim 1, further comprising:
    generating, by the network side device, a Traffic Channel Assignment message; and
    informing a terminal of the configuration of the forward carrier corresponding to the plurality of reverse carriers by sending the Traffic Channel Assignment message to the terminal.

5. The method according to claim 4, wherein:
    the Traffic Channel Assignment message comprises a first parameter that indicates the number of the Media Access Control channels carried by the forward carrier.

6. The method according to claim 5, wherein:
    the Traffic Channel Assignment message further comprises a second parameter that indicates whether the Traffic Channel Assignment message comprises the first parameter.

7. The method according to claim 4, wherein:
    if a parameter indicating the number of the Media Access Control channels is not included in the Traffic Channel Assignment message, the number of the Media Access Control channels carried by the forward carrier is 1 by default.

8. The method according to claim 4, wherein:
    the Traffic Channel Assignment message comprises a third parameter that indicates the reverse carrier corresponding to the forward carrier.

9. The method according to claim 4, wherein:
    the Traffic Channel Assignment message comprises a fourth parameter that indicates whether any of the Media Access Control channels carried by the forward carrier comprises a Data Rate Control Lock subchannel.

10. A network side device in a multicarrier communication system, comprising:
- a reverse carrier information unit, configured to obtain information of a plurality of reverse carriers;
- a forward carrier configuring unit, configured to set one forward carrier corresponding to the plurality of reverse carriers according to the information of the reverse carriers, so as to make the forward carrier to carry a plurality of Media Access Control channels corresponding to the reverse carriers,
- wherein in configuring the one forward carrier, the forward carrier configuring unit is configured to:
- allocate different Media Access Control channel indexes to the Media Access Control channels corresponding to different reverse carriers, and
- if one of the plurality of reverse carriers corresponding to the forward carrier has a Data Rate Control channel to transmit, set the Media Access Control channel that corresponds to the one of the plurality of reverse carriers so that the Media Access Control channel comprises a Data Rate Control Lock subchannel; and
- an informing unit, configured to inform a terminal of the configuration of the forward carrier.

11. The network side device according to claim 10, wherein the configuration information of the forward carrier is sent to the terminal via a Traffic Channel Assignment message.

12. The network side device according to claim 11, wherein the Traffic Channel Assignment message comprises a first parameter that indicates the number of Media Access Control channels carried by the forward carrier.

13. The network side device according to claim 11, wherein, the Traffic Channel Assignment message comprises a third parameter that indicates the reverse carriers corresponding to the forward carrier.

14. The network side device according to claim 11, wherein, the Traffic Channel Assignment message comprises a fourth parameter that indicates whether any of the Media Access Control channels carried by the forward carrier comprises a Data Rate Control Lock subchannel.

15. The network side device according to claim 10, wherein each of at least two of the plurality of reverse carriers corresponding to the forward carrier has a Data Rate Control channel to transmit, each of the Media Access Control channels corresponding to the each of the at least two reverse carriers comprises a Data Rate Control Lock subchannel.

16. A terminal in a multicarrier communication system, communicating with a network side device, the terminal comprises:
- a receiver, configured to receive a forward carrier and a configuration of the forward carrier from the network side device, wherein the forward carrier is configured to carry a plurality of Media Access Control channels corresponding to a plurality of reverse carriers, wherein the Media Access Control channels corresponding to different reverse carriers are allocated different Media Access Control channel indexes and if one of the plurality of reverse carriers corresponding to the one forward carrier has a Data Rate Control channel to transmit, the Media Access Control channel that corresponds to the one of the plurality of reverse carriers is so configured that it comprises a Data Rate Control Lock subchannel; and
- a transmitter, configured to transmit the plurality of reverse carriers according to the received forward carrier and the configuration of the forward carrier.

17. The terminal according to claim 16, wherein the configuration of the forward carrier is received via a Traffic Channel Assignment message.

18. The terminal according to claim 17, wherein the Traffic Channel Assignment message comprises a first parameter that indicates the number of the Media Access Control channels carried by the forward carrier.

19. The terminal according to claim 17, the Traffic Channel Assignment message comprises a third parameter that indicates the reverse carriers corresponding to the forward carrier.

20. The terminal according to claim 16, wherein each of at least two of the plurality of reverse carriers has a Data Rate Control channel to transmit, each of the Media Access Control channels corresponding to the each of the at least two reverse carriers comprises a Data Rate Control Lock subchannel.

* * * * *